United States Patent
Sawahashi et al.

(10) Patent No.: US 8,160,595 B2
(45) Date of Patent: Apr. 17, 2012

(54) BASE STATION APPARATUS AND COMMUNICATION CONTROL METHOD

(75) Inventors: Mamoru Sawahashi, Yokohama (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 276 days.

(21) Appl. No.: 12/598,136

(22) PCT Filed: Apr. 28, 2008

(86) PCT No.: PCT/JP2008/058213
§ 371 (c)(1), (2), (4) Date: Jan. 14, 2010

(87) PCT Pub. No.: WO2008/136468
PCT Pub. Date: Nov. 13, 2008

(65) Prior Publication Data
US 2010/0113048 A1 May 6, 2010

(30) Foreign Application Priority Data
May 1, 2007 (JP) ................................ 2007-121303

(51) Int. Cl.
*H04W 40/00* (2009.01)
(52) U.S. Cl. ...................................... 455/446; 455/67.11
(58) Field of Classification Search ............... 455/67.11, 455/62, 444, 443, 429, 446, 33.1, 33.4
See application file for complete search history.

(56) References Cited

U.S. PATENT DOCUMENTS

| | | | |
|---|---|---|---|
| 7,120,467 B2* | 10/2006 | Umesh et al. | 455/562.1 |
| 7,194,269 B2* | 3/2007 | Sydor | 455/446 |
| 7,386,305 B2* | 6/2008 | Etkin et al. | 455/422.1 |

FOREIGN PATENT DOCUMENTS

| | | |
|---|---|---|
| JP | 2004-529524 A | 9/2004 |
| JP | 2005-252886 A | 9/2005 |
| JP | 2006-033826 A | 2/2006 |
| JP | 2006-042203 A | 2/2006 |
| JP | 2006-319755 A | 11/2006 |
| WO | 02/49385 A3 | 6/2002 |

OTHER PUBLICATIONS

Patent Abstracts of Japan, Publication No. 2006-319755, dated Nov. 24, 2006, 1 page.
Patent Abstracts of Japan, Publication No. 2006-042203, dated Feb. 9, 2006, 1 page.
Patent Abstracts of Japan, Publication No. 2006-033826, dated Feb. 2, 2006, 1 page.
Patent Abstracts of Japan, Publication No. 2005-252886, dated Sep. 15, 2005, 1 page.
3GPP TR 25.814 V7.0.0, Jun. 2006, "Physical layer aspects for evolved Universal Terrestrial Radio Access (UTRA)," 126 pages.
3GPP TSG RAN WG Meeting #47bis, R1-070103, Jan. 15-19, 2007, "Downlink L1/L2 Control Signaling Channel Structure: Coding," 17 pages.
International Search Report issued in PCT/JP2008/058213, dated Jul. 29, 2008, with translation, 9 pages.
Written Opinion issued in PCT/JP2008/058213, dated Jul. 29, 2008, 3 pages.

* cited by examiner

*Primary Examiner* — Tu X Nguyen
(74) *Attorney, Agent, or Firm* — Osha • Liang LLP

(57) ABSTRACT

In a base station apparatus for transmitting a L1/L2 control channel to a user apparatus to communicate with the user apparatus, a plurality of combinations of a modulation scheme and a channel coding scheme which include a plurality of types of coding rates are prepared. The user apparatus reports downlink feedback information. The base station apparatus includes: a unit configured to collect the downlink feedback information; a unit configured to calculate a statistic based on the collected feedback information; a unit configured to determine whether a cell covered by the base station apparatus is an isolated cell or a cellular cell based on the statistic; and a unit configured to set a combination of the modulation scheme and the channel coding rate to be applied to the L1/L2 control channel based on the determination result.

6 Claims, 7 Drawing Sheets

FIG.4

| MCS SET | MODULATION SCHEME | CODING RATE |
|---|---|---|
| MCS#1 | QPSK | $\frac{3}{4}$ |
| MCS#2 | QPSK | $\frac{2}{3}$ |
| MCS#3 | QPSK | $\frac{1}{3}$ |
| MCS#4 | QPSK | $\frac{1}{6}$ |
| MCS#5 | QPSK | $\frac{1}{9}$ |

FIG.6

| CONTROL INFORMATION | RADIO RESOURCE AMOUNT OF L1/L2 CONTROL CHANNEL | |
|---|---|---|
| | PATTERN A | PATTERN B |
| 00 | 1 SYMBOL | 0.5 SYMBOL |
| 01 | 2 SYMBOL | 1.0 SYMBOL |
| 10 | 3 SYMBOL | 1.5 SYMBOL |
| 11 | — | 2.0 SYMBOL |

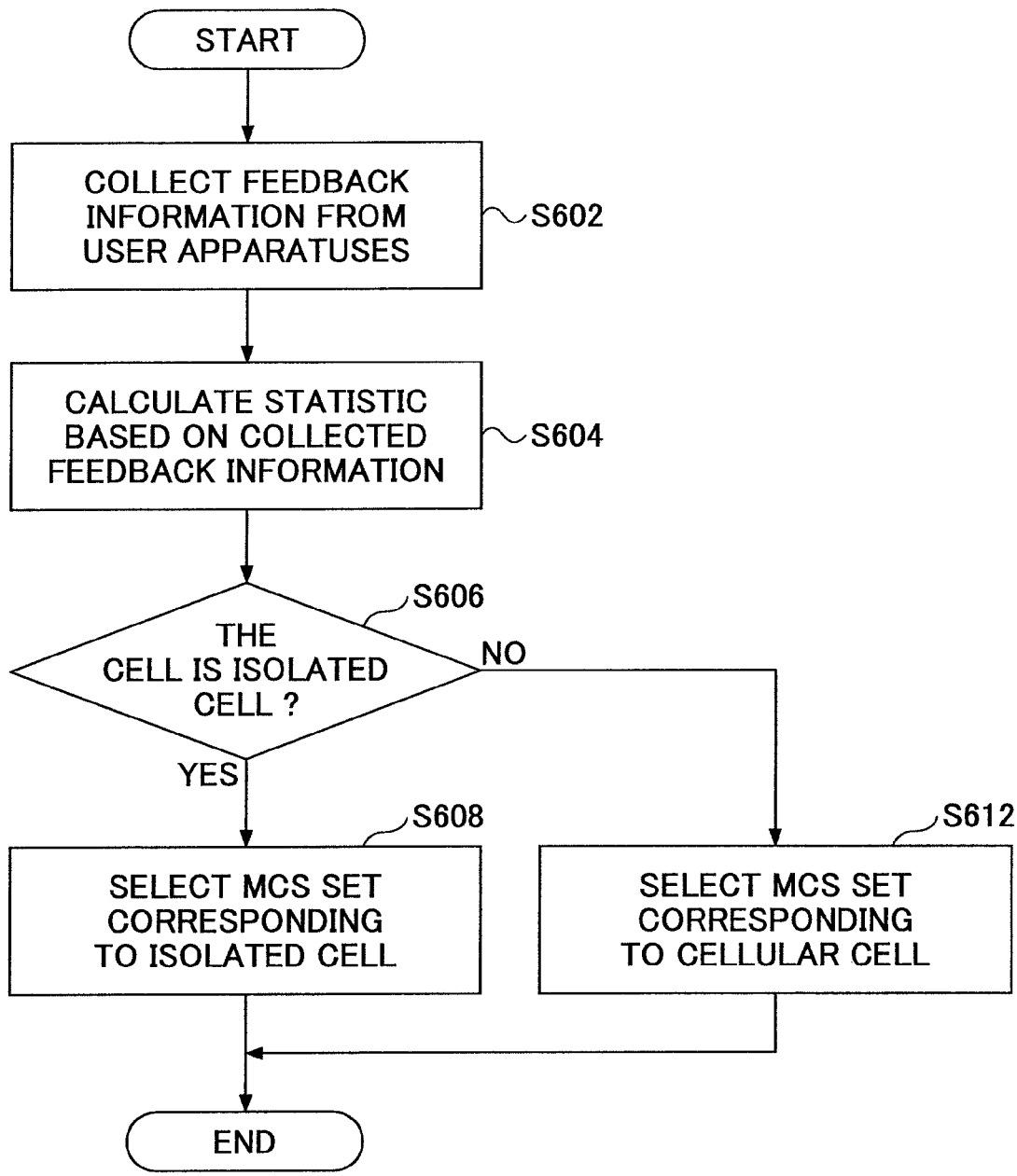

BASE STATION APPARATUS AND COMMUNICATION CONTROL METHOD

TECHNICAL FIELD

The present invention relates to a radio communication system. More particularly, the present invention relates to a base station apparatus and a communication control method.

BACKGROUND ART

3GPP that is a standardization group of W-CDMA is studying a communication scheme that becomes a successor to W-CDMA, HSDPA and HSUPA, that is, 3GPP is studying Long Term Evolution (LTE). As radio access schemes, OFDM (Orthogonal Frequency Division Multiplexing) is being studied for downlink, and SC-FDMA (Single-Carrier Frequency Division Multiple Access) is being studied for uplink (refer to non-patent document 1, for example).

OFDM is a scheme for dividing a frequency band into a plurality of narrow frequency bands (subcarriers) so as to perform transmission by carrying data on each subcarrier. By arranging the subcarriers on frequencies densely without interfering with each other while a part of them overlap, high speed transmission is realized so that efficiency of use of frequency increases.

SC-FDMA is a transmission scheme that can decrease interference among terminals by dividing frequency band and performing transmission using frequency bands that are different among a plurality of terminals. Since the SC-FDMA has characteristics that variation of transmission power becomes small, low power consumption in the terminal and wide coverage can be realized.

LTE is a system in which a plurality of user apparatuses share one or more physical channels in the uplink and the downlink for performing communication. The channel shared by the plurality of user apparatuses is generally called a shared channel. In LTE, the channel is the Physical Uplink Shared Channel (PUSCH) in the uplink, and is the Physical Downlink Shared Channel (PDSCH) in the downlink.

In the communication system using the above-mentioned shared channel, it is necessary to signal information indicating which user apparatus is assigned the shared channel for each subframe (1 ms in LTE). In LTE, a control channel used for the signaling is called Physical Downlink Control Channel (PDCCH) or called Downlink L1/L2 Control Channel (DL L1/L2 Control Channel). Information of the physical downlink control channel includes, for example, downlink (DL) scheduling information, acknowledgement information (ACK/NACK), uplink (UL) scheduling grant, overload indicator, transmission power control command bit and the like (refer to non-patent document 2, for example).

The DL scheduling information and the UL scheduling grant correspond to the information for signaling which user apparatus is assigned the shared channel. The DL scheduling information includes, for example, assignment information of resource blocks in downlink, ID of UE, the number of streams, information on precoding vector, data size, modulation scheme, information on HARQ (hybrid automatic repeat request), and the like with respect to the downlink shared channel. The UL scheduling grant includes, for example, assignment information of resource blocks in uplink, ID of UE, data size, modulation scheme, uplink transmission power information, demodulation reference signal in uplink MIMO, and the like with respect to the uplink shared channel.

In the L1/L2 control channel of the E-UTRA, it is being discussed to define a plurality of sets of modulation and coding (MCS (modulation and coding scheme) set (combinations of modulation scheme and channel coding scheme)), and to change the MCS set according to a position and propagation loss of a user apparatus (UE: User Equipment) which is performing communication in the cell. More particularly, when the propagation loss of the UE is large, a low coding rate and a low modulation multilevel number are used. Accordingly, even when the propagation loss is large, it becomes possible to ensure the quality of the L1/L2 control channel.

[Non-patent document 1] 3GPP TR 25.814 (V7.0.0), "Physical Layer Aspects for Evolved UTRA," June 2006
[Non-patent document 2] R1-070103, Downlink L1/L2 Control Signaling Channel Structure: Coding

DISCLOSURE OF THE INVENTION

Problem to be Solved by the Invention

However, the above-mentioned background technique has the following problem.

The quality of the L1/L2 control channel varies according to cell configurations, more particularly, according to cellular cells, isolated cells, and the like. But, controlling depending on such cell configurations is not performed. In actual fact, the MCS set of the L1/L2 control channel is determined based on designing of macro cells, which is the worst case in which it is difficult to ensure reception quality. When the L1/L2 control channel is transmitted by the MCS set determined in this way, a user apparatus which is located at a center area of the cell receives the L1/L2 control channel with excessive quality, which is not efficient.

In view of the above-mentioned problem, an object of the present invention is to provide a base station apparatus and a communication control method which can change the MCS set of the L1/L2 control channel based cell configurations.

Means for Solving the Problem

In order to overcome the above problem, one aspect of the present invention relates to a base station apparatus for transmitting a L1/L2 control channel to a user apparatus to communicate with the user apparatus,
wherein a plurality of combinations of a modulation scheme and a channel coding scheme which include a plurality of types of coding rates are prepared, and the user apparatus reports downlink feedback information,
the base station apparatus including:
a feedback information collecting unit configured to collect the downlink feedback information;
a statistic calculation unit configured to calculate a statistic based on the feedback information collected by the feedback information collecting unit;
a cell determination unit configured to determine whether a cell covered by the base station apparatus is an isolated cell or a cellular cell based on the statistic; and
a setting unit configured to set a combination of the modulation scheme and the channel coding rate to be applied to the L1/L2 control channel based on the determination result.

Another aspect of the present invention relates to a communication control method in a base station apparatus for transmitting a L1/L2 control channel to a user apparatus to communicate with the user apparatus,
wherein a plurality of combinations of a modulation scheme and a channel coding scheme which include a plurality of types of coding rates are prepared, the communication control method including:

a feedback information reporting step in which the user apparatus reports downlink feedback information;

a feedback information collecting step in which the base station apparatus collects the downlink feedback information;

a statistic calculation step in which the base station apparatus calculates a statistic based on the feedback information collected in the feedback information collecting step;

a cell determination step in which the base station apparatus determines whether a cell covered by the base station apparatus is an isolated cell or a cellular cell based on the statistic; and a setting step in which the base station apparatus sets a combination of the modulation scheme and the channel coding scheme to be applied to the L1/L2 control channel based on the determination result.

Effect of the Present Invention

According to the present invention, a base station apparatus and a communication control method which can change the MCS set of the L1/L2 control channel based cell configurations can be realized.

BRIEF DESCRIPTION OF THE DRAWINGS

FIG. 4 is an explanatory diagram showing an example of a MCS set;

FIG. 6 is an explanatory diagram showing correspondence between control information and radio resource amount of L1/L2 control channel; and FIG. 7 is a flowchart showing operation of the base station apparatus of an embodiment of the present invention.

Figure 1:
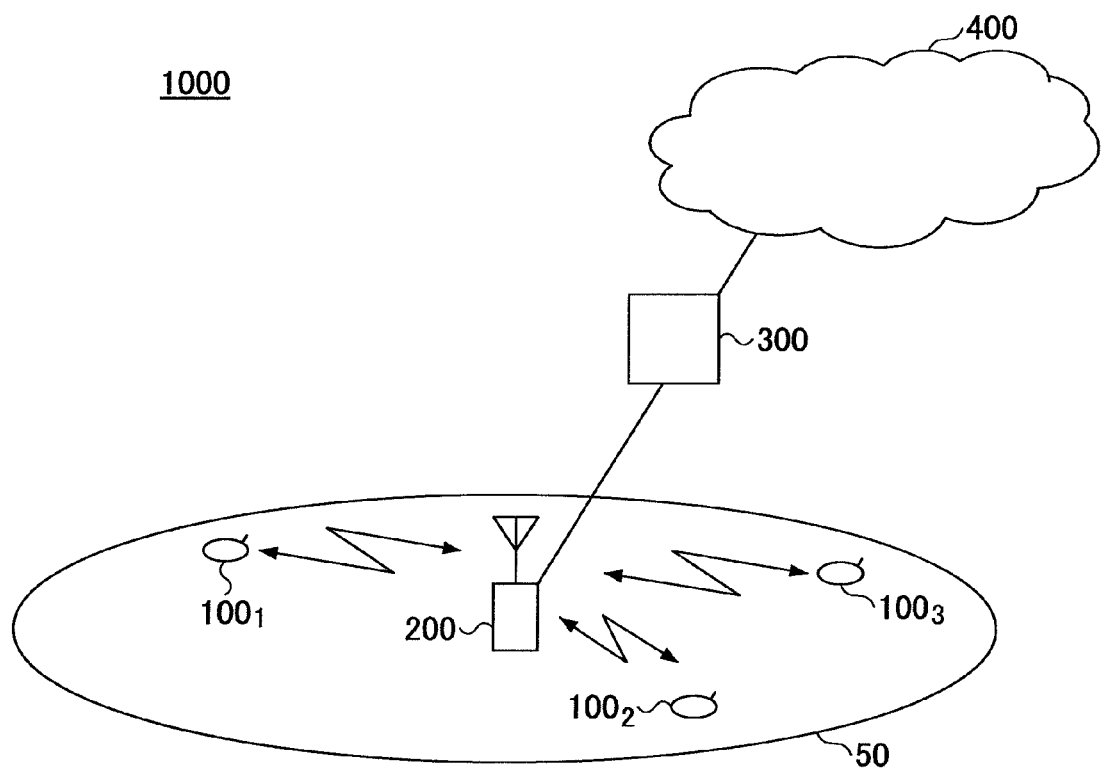
FIG. 1 is a block diagram showing a configuration of a radio communication system of an embodiment of the present invention.

DESCRIPTION OF REFERENCE SIGNS 50 cell
$100_1, 100_2, 100_3, 100_n$ user apparatus
200 base station apparatus
202 ($202_1, \ldots, 202_N$) control signal generation unit
204 ($204_1, \ldots, 204_N$) coding/modulation unit
206 control unit
208 L1/L2 control channel multiplexing unit
210 uplink control channel reception unit
212 broadcast information generation unit
214 coding/modulation unit
216 multiplexing unit
218 OFDM modulation unit
220 CP adding unit
222 radio unit
300 access gateway apparatus
400 core network
1000 radio communication system

PREFERRED EMBODIMENTS FOR CARRYING OUT THE INVENTION

In the following, embodiments of the present invention are described with reference to figures. In all of the figures for explaining embodiments, the same reference symbols are used for parts having the same function, and repeated descriptions are not given.

Figure 2:
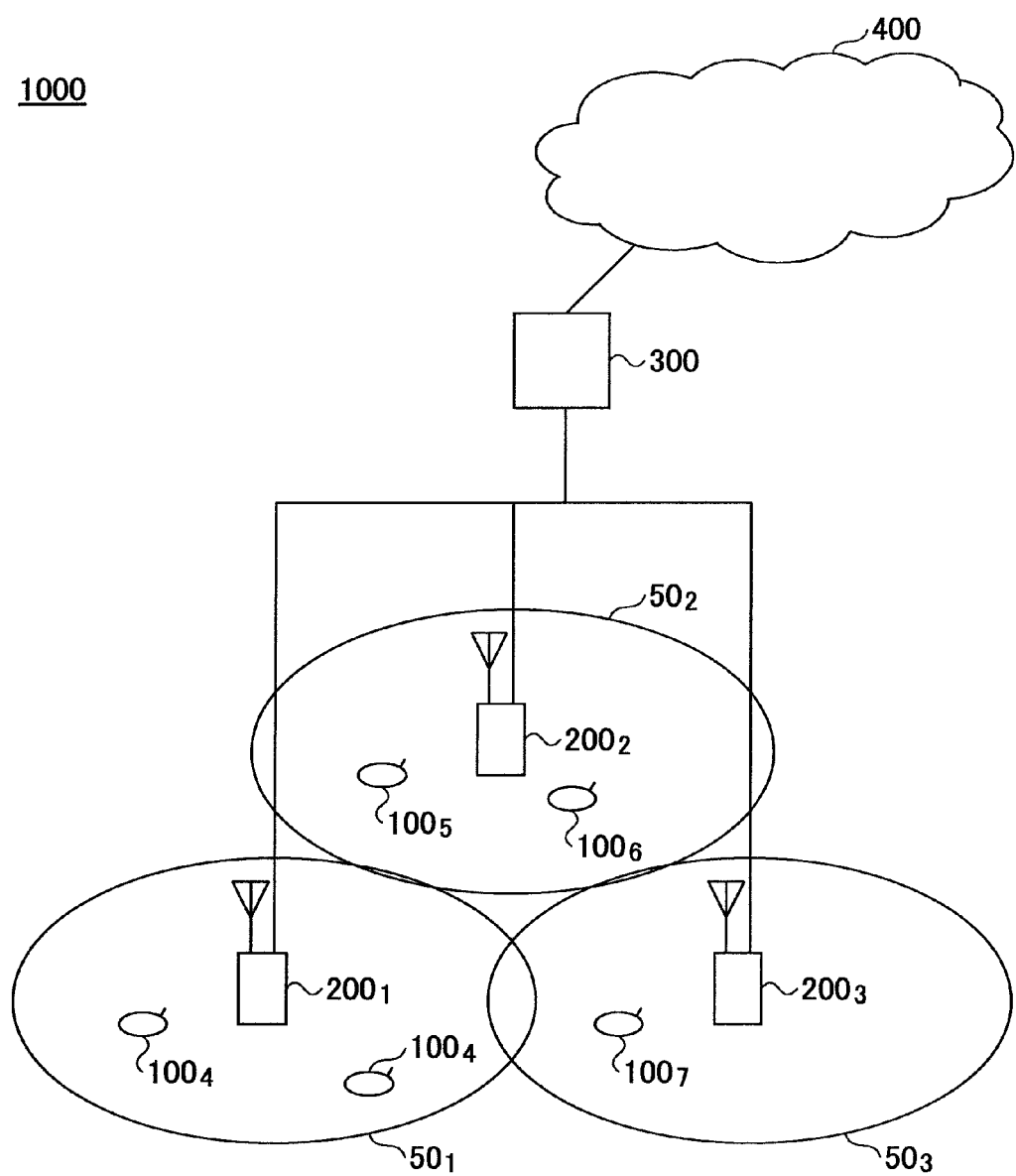
FIG. 2 is a block diagram showing a configuration of a radio communication system of an embodiment of the present invention.

A mobile communication system including the user apparatus and the base station apparatus of an embodiment of the present invention is described with reference to FIGS. 1 and 2. FIG. 1 shows an isolated cell, and FIG. 2 shows a cellular cell.

The radio communication system 1000 is a system to which Evolved UTRA and UTRAN (Another name: Long Term Evolution, or Super 3G) is applied, for example. The radio communication system 1000 includes a base station apparatus (eNB: eNode B) 200 ($200_1, 200_2, 200_3$) and a plurality of user apparatuses $100_n$ ($100_1, 100_2, 100_3, \ldots 100_n$, n is an integer and n>0). The base station apparatus 200 is connected to an upper station, that is, an access gateway apparatus 300, for example, and the access gateway apparatus 300 is connected to a core network 400. The user apparatus $100_n$ is communicating with the base station apparatus 200 by Evolved UTRA and UTRAN in a cell 50 ($50_1, 50_2, 50_3$).

In the following, since the user apparatuses ($100_1, 100_2, 100_3, \ldots 100_n$) have the same configurations, functions and states, a user apparatus $100_n$ is described unless otherwise mentioned. For the sake of convenience of explanation, although the entity which communicates with the base station apparatus by radio is the user apparatus, it is a user apparatus (UE: User Equipment) including a mobile terminal and a fixed terminal more generally.

As radio access schemes, the radio communication system 1000 uses OFDM (orthogonal frequency division multiplexing) in the downlink, and uses SC-FDMA (single carrier-frequency division multiple access) in the uplink. As mentioned above, OFDM is a multi-carrier transmission scheme in which a frequency band is divided into a plurality of narrow frequency bands (subcarriers) so that transmission is performed by mapping data on each subcarrier. SC-FDMA is a single carrier transmission scheme that can decrease interference among terminals by dividing a frequency band for each terminal and by using different frequency bands with each other by a plurality of terminals.

In the following, communication channels in the Evolved UTRA and UTRAN are described.

In the downlink, the physical downlink shared channel (PDSCH) shared by each user apparatus $100_n$ and the physical downlink control channel (PDCCH) are used. The physical downlink control channel is also called a downlink L1/L2 control channel. User data, that is, a normal data signal is transmitted by the physical downlink shared channel. Also, the physical downlink control channel transmits downlink scheduling information, acknowledgment information (ACK/NACK), uplink scheduling grant, overload indicator, transmission power control command bit and the like.

The DL scheduling information includes, for example, ID of a user performing communication using the physical downlink shared channel, information of transport format of the user data, that is, information related to data size, modulation scheme and HARQ, and includes assignment information of downlink resource blocks, and the like.

The UL scheduling grant includes, for example, ID of a user performing communication using the physical uplink shared channel, information of transport format of the user data, that is, information related to data size and modulation scheme, and includes assignment information of the uplink resource blocks, information on transmission power of the uplink shared channel, and the like. The uplink resource block corresponds to frequency resources, and is also called a resource unit.

The acknowledgement information (ACK/NACK) is acknowledgement information on the uplink shared channel.

In the uplink, the physical uplink shared channel (PUSCH) shared by each user apparatus $100_n$ and the physical uplink control channel are used. The physical uplink shared channel transmits user data, that is, the normal data signal. In addition, the physical uplink control channel transmits downlink quality information (CQI: Channel Quality Indicator) used for scheduling processing for the physical downlink shared channel and for the adaptive modulation and coding scheme (AMCS), and transmits acknowledgment information of the physical downlink shared channel. The contents of the acknowledgment information are represented as either one of Acknowledgement (ACK) indicating that a transmission signal has been properly received or Negative Acknowledgement (NACK) indicating that the signal has not been properly received.

In addition to the CQI and the acknowledgement information, the physical uplink control channel may transmit a scheduling request requesting resource assignment of the uplink shared channel, resource request in persistent scheduling, and the like. The resource assignment of the uplink shared channel means that the base station apparatus reports, using the physical downlink control channel of a subframe, information to the user apparatus indicating that the user apparatus is permitted to perform communication using the uplink shared channel in a following subframe.

Figure 3:
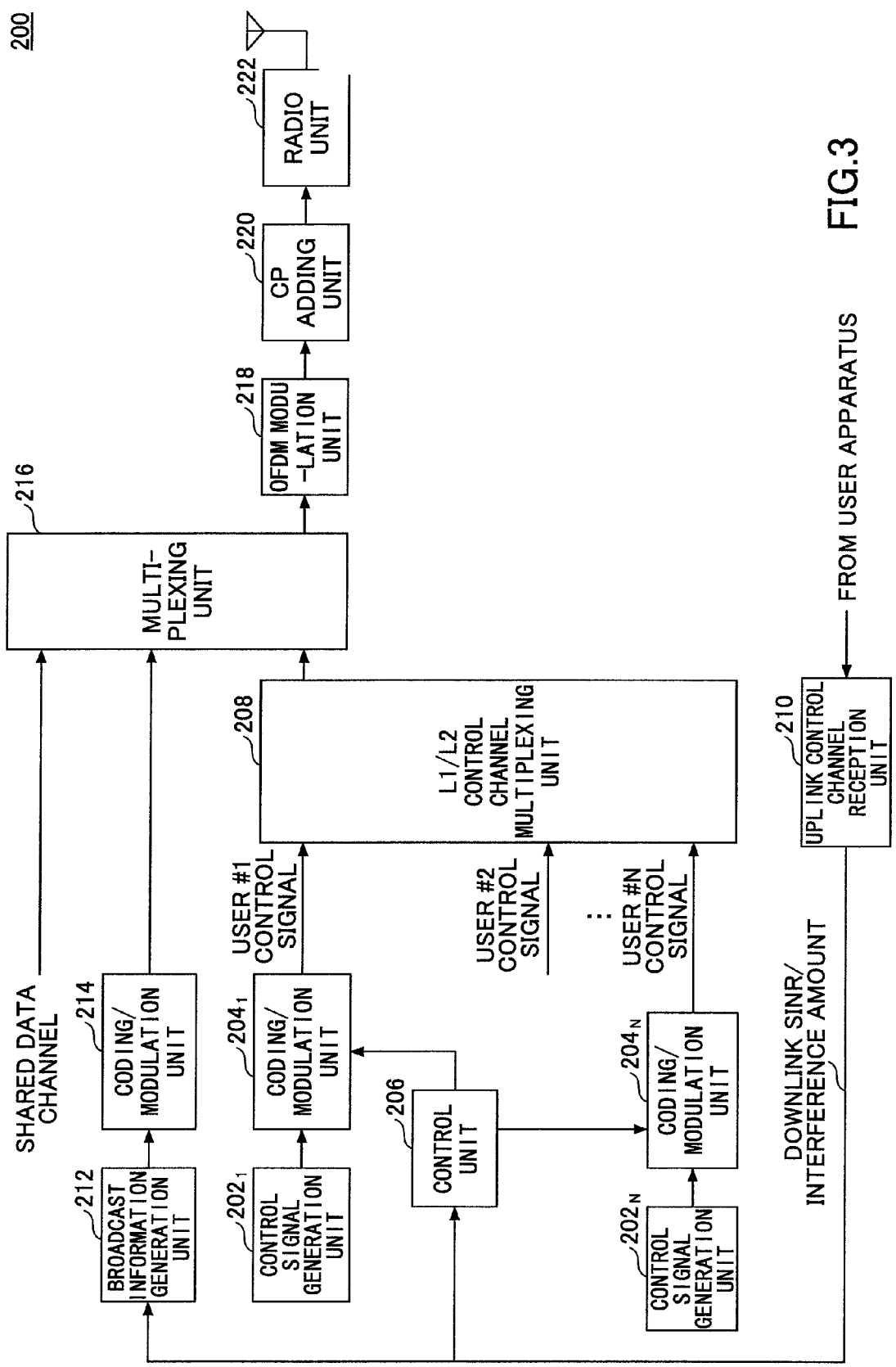
FIG. 3 is a partial block diagram showing a base station apparatus of an embodiment of the present invention.

The base station apparatus 200 of an embodiment of the present invention is described with reference to FIG. 3.

The base station apparatus 200 according to the present embodiment includes a control signal generation unit 202 ($202_1$-$202_N$), a coding/modulation unit 204 ($204_1$-$204_N$), a control unit 206, a L1/L2 control channel multiplexing unit 208, an uplink control channel reception unit 210, a broadcast information generation unit 212, a coding/modulation unit 214, a multiplexing unit 216, an OFDM modulation unit 218, a CP adding unit 220, and a radio unit 222.

Each of the control signal generation units $202_1$-$202_N$ generates a L1/L2 control signal for respective users #1-#N, and supplies the signal to the coding/modulation units $204_1$-$204_N$.

Feedback information from the user apparatus 100 is received by the uplink control channel reception unit 210. The feedback information includes downlink reception quality, which is, for example, SINR (signal-to-interference and noise ratio) which is a ratio of interference power and noise power to signal power, and includes downlink interference amount. The uplink control channel reception unit 210 inputs downlink interference amount/reception quality including SINR and downlink interference amount to the control unit 206 based on the received feedback information.

A plurality of types of combinations of modulation scheme and channel coding scheme (MCS set) are defined in the control unit 206 beforehand. For example, as shown in FIG. 4, QPSK (Quaternary phase shift keying) is defined as the modulation scheme, and five types of ¾, ⅔, ⅓, ⅙ and ⅑ are defined as the coding rate for MCS set #1-#5. The control unit 206 determines MCS sets to be used from among the above-mentioned MCS sets when the base station apparatus is installed, or with a long period, for example, once in a month. For example, the control unit 206 collects downlink interference amount/reception quality input from the uplink control channel reception unit 210 for a predetermined time period, calculates a statistic, which is an average value, for example, based on the collected downlink interference amount/reception quality, and autonomously determines MCS set to be used based on the calculated statistic. As mentioned above, by selecting the MCS set autonomously, the MCS set can be set up without making settings for every installation of station by an operator, for example.

For example, when an average value of reception quality is used as the statistic, more particularly, when an average value of SINR is used as the statistic, if the average value of SINR is equal to or greater than a predetermined threshold which is determined beforehand, it can be determined that the own cell is an isolated cell, so that it is determined to use a MCS set in which coding rate is high, more particularly, it is determined to use MCS #1-#3. When the average value of SINR is less than the predetermined threshold which is determined beforehand, it is determined that the own cell is a cellular cell, so that it is determined to use a MCS set in which the coding rate is low, more particularly, it is determined to use MCS #3-#5. In the cellular cell, interference amount is large, and SINR is small in general. Thus, by selecting the MCS set based on the feedback information, an MCS set including low coding rate is autonomously selected for the cellular cell and the like. Therefore, the threshold is determined for identifying the isolated cell or the cellular cell. The control unit 206 inputs information indicating the determined MCS set to the broadcast information generation unit 212.

As shown in FIG. 2, as to the cellular cell, a wide area is covered by connecting cells in which there is an adjacent cell for each cell. FIG. 2 shows a configuration forming the cellular cells by three cells. But, the number of cells may be two or may be equal to or greater than four. In the cellular cell, as a user apparatus moves closer to a cell edge, there is interference from the adjacent cell. Thus, as to the cellular cell, especially in the cell edge, since there is large effect of interference from neighboring cells, the MCS set of the L1/L2 control channel is determined to include a coding rate and a modulation multilevel number which are lower than those for the isolated cell. Accordingly, although the overhead of the L1/L2 control channel becomes large, quality can be ensured. As to the cellular cell, since the coverage is important, it is important to ensure quality of the L1/L2 control channel at the cell edge even though overhead is increased to some extent.

The isolated cell is a cell other than the cellular cell. As shown in FIG. 1, the isolated is a relatively independent cell. The isolated cell has characteristics that interference from neighboring cells is small. Accordingly, since the effect of interference from neighboring cells is small in the isolated cell, the MCS set of the L1/L2 control channel is determined to include a higher coding rate and a higher modulation multilevel number compared to those for the cellular cell. In the isolated cell, it is important to decrease overhead of the L1/L2 control channel so as to increase the data rate of the data channel or increase the number of accommodated users.

The control unit 206 determines a MCS set to be used from the MCS sets. More particularly, the control unit 206 determines a MCS set to be used from among MCS#1-#3 and MCS#3-#5, and inputs it to the coding/modulation unit 204.

The coding/modulation unit 204 performs coding processing and modulation processing on the input L1/L2 control signal based on the determined MCS set, and inputs the processed signal into the L1/L2 control channel multiplexing unit 208.

The L1/L2 control channel multiplexing unit 208 multiplexes L1/L2 control information of each user input from the coding/modulation units $204_1$-$204_N$, and inputs the multiplexed information into the multiplexing unit 216.

The broadcast information generation unit 212 generates broadcast information including information of the MCS set to be used, and inputs the broadcast information into the coding/modulation unit 214. The coding/modulation unit 214 performs coding processing and modulation processing on the input broadcast information, and inputs the processed information to the multiplexing unit 216.

Figure 5:
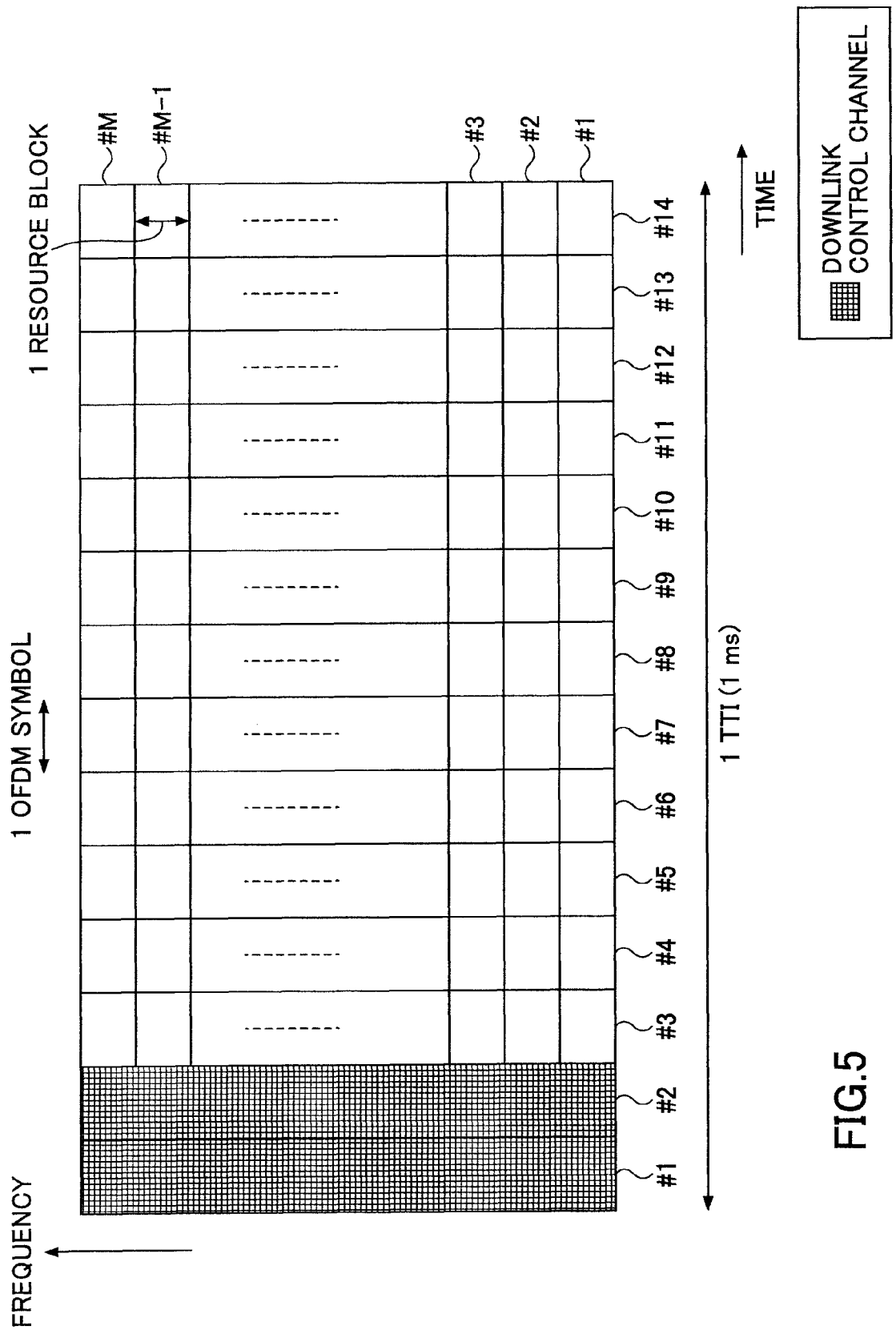
FIG. 5 is an explanatory diagram showing a configuration of TTI.

In the downlink transmission, as shown in FIG. 5, 1 TTI (transmission time interval) is 1 ms, for example, and 14 OFDM symbols exist in 1 TTI. In FIG. 5, numbers (#1, #2, #3, . . . , #14) in the time axis direction indicate numbers for identifying OFDM symbols, and the numbers (#1, #2, #3, . . . , #M−1, #M, M is an integer of M>0) in the frequency axis direction indicate numbers identifying resource blocks.

The downlink control channel for LTE (L1/L2 control channel) is mapped to OFDM symbols within three symbols from the head of the 1 TTI. In FIG. 5, the downlink control channel for LTE is mapped to the head two OFDM symbols of the 1 TTI. Then, in OFDM symbols other than the OFDM symbols to which the downlink control channel for LTE is mapped, normal user signal, SCH, BCH, and data signal to which transmission power control is applied are transmitted.

In addition, in the frequency direction, M resource blocks are defined. The frequency band of 1 resource block is 180 kHz, for example, and 12 subcarriers exist in 1 resource block. The number M of the resource blocks is 25 when the system bandwidth is 5 MHz, and it is 50 when the system bandwidth is 10 MHz, and it is 100 when the system bandwidth is 20 MHz.

OFDM symbols to which the L1/L2 control channel is mapped are specified by the L1/L2 control channel. For example, as shown in FIG. 6, in the case when two bits are prepared as control information for specifying the OFDM symbols to which the L1/L2 control channel is mapped, 1-3 OFDM symbols are assigned respectively to four types of control information represented by two bits. In this case, assignment is not performed in one type of control information. In addition, OFDM symbols incremented by 0.5 OFDM symbol from 0.5 OFDM symbol to 2.0 OFDM symbols may be assigned respectively to four types of control information represented by two bits. In FIG. 6, pattern A and pattern B are shown in which 1-3 OFDM symbols are assigned in pattern A, and OFDM symbols incremented by 0.5 OFDM symbol from 0.5 OFDM symbol to 2.0 OFDM symbols are assigned in pattern B.

Which one of the pattern A and the pattern B is used is reported by broadcast information, for example. In this case, the broadcast information generation unit 212 generates broadcast information including information indicating a combination of control information specifying OFDM symbols to which the L1/L2 control channel is mapped and radio resource amount of the L1/L2 control channel.

The multiplexing unit 216 multiplexes a shared data channel, broadcast information input from the coding/modulation unit 214, the L1/L2 control channel input from the L1/L2 control channel multiplexing unit 208, so as to input the multiplexed data to the OFDM modulation unit 218.

The OFDM modulation unit 218 performs OFDM modulation on the signal in which the shared data channel, the broadcast information and the L1/L2 control channel are multiplexed, and inputs the modulated signal to the CP adding unit 220. The CP adding unit 220 adds CP to the OFDM modulated signal in which the shared data channel, the broadcast information and the L1/L2 control channel are multiplexed, and inputs the CP-added signal to the radio unit 222.

The radio unit 222 performs processing such as digital-analog conversion, frequency conversion and band limitation on the CP-added and OFDM modulated signal in which the shared data channel, the broadcast information and the L1/L2 control channel are multiplexed, so as to amplify the signal to a proper power, and transmit it.

The user apparatus 100 sets the MCS set to be used based on the broadcast information from the base station apparatus 200. The user apparatus 100 performs MCS decision using a method based on blind detection in which decoding is performed by assuming all MCSes that were set. In this case, the base station apparatus 200 does not explicitly perform signaling for reporting MCS to be used.

In addition, the base station apparatus 200 may report the MCS set to be applied for the L1/L2 control channel by using signaling. In this case, for example, the MCS set may be reported by using the L1/L2 control channel with high frequency, or may be reported by using a broadcast channel.

In addition, by increasing the period of MCS change, it may be applied only at the timing of change to perform decoding by assuming all MCSes which were set. In this case, the period (timing) of the change is reported by the broadcast channel. Or, it may be reported by the individual control channel of layer 3. The period of the change may be changed for each user apparatus, or may be changed according to moving speed of the user apparatus. At the timing of change of MCS, since process load of the user apparatus increases, the base station apparatus 200 may perform scheduling such that user data is not assigned at the timing of change, or such that user data is assigned only with low data rate at the timing.

Next, operation of the base station apparatus 200 of the present embodiment is described with reference to FIG. 7.

The feedback information transmitted from the user apparatus 100 is received by the uplink control channel reception unit 210, and is input to the control unit 206.

The control unit 206 collects feedback information transmitted from the user apparatus 100 for a predetermined time period (step S602).

The control unit 206 calculates a statistic based on the collected feedback information (step S604). For example, the control unit 206 calculates the statistic which is an average value of reception quality, for example, based on the collected downlink interference amount/reception quality, for example.

The control unit 206 determines whether the area covered by the base station apparatus 200 is the isolated cell or the cellular cell based on the calculated statistic (step S606). For example, in the case when the average value of the reception quality is applied as the statistic, if the calculated average value is equal to or greater than a predetermined threshold which is determined beforehand, the cell is determined to be the isolated cell, and if the calculated average value is less than the predetermined threshold which is determined beforehand, the cell is determined to be the cellular cell.

If the area covered by the base station apparatus 200 is the isolated cell (step S606: YES), a MCS set corresponding to the isolated cell is selected (step S608). More particularly, determination is performed so as to use MCS set in which the coding rate is high, more particularly, to use MCS #1-#3 described with reference to FIG. 4.

On the other hand, if the area covered by the base station apparatus 200 is not the isolated cell (step S606: NO), a MCS set corresponding to the cellular cell is selected (step S612). More particularly, determination is performed so as to use a MCS set in which the coding rate is lower than that in the MCS set assigned to the isolated cell, more particularly, to use MCS #3-#5 described with reference to FIG. 4.

In the above embodiment, although a case is described in which the MCS set is set based on the reception quality in feedback information from the user apparatus, similar processing can be applied to a case in which the MCS set is set based on downlink interference amount. In the case of setting the MCS set based on the downlink interference amount, for example, an average value of downlink interference amount is applied as the statistic. Then, if the calculated average value is equal to or greater than a predetermined threshold which is determined beforehand, the cell is determined to be the cellular cell. If the calculated average value is less than the predetermined threshold which is determined beforehand, the cell is determined to be the isolated cell.

In the above-mentioned embodiment, although a case is described in which each base station autonomously determines a MCS set to be used based on report of interference amount or SINR from UE, the MCS set may be determined when the base station is installed. More particularly, the MCS set may be determined as a system parameter of the base station, or the MCS set may be set as a parameter of the base station from a network maintenance monitoring system. In this case, a MCS set is set including a coding rate which results in a low modulation multilevel number for the cellular cell and for a cell having a large radius. For the isolated cell, a MCS set is set including a coding rate which results in a modulation multilevel number greater than that for the MCS set for the cellular cell and for a cell having a large radius. Accordingly, compared with the above-mentioned autonomous control, intended control can be performed with reliability.

In addition, in the above-embodiment, a case is described in which the MCS set is changed. But, since high quality is required and high data rate is not required for the L1/L2 control channel, the modulation multilevel number may be fixed to be QPSK and the like, so that only the coding rate may be changed.

In addition although a case is described in which every modulation scheme includes QPSK in MCS sets, different modulation scheme such as 16QAM (Quadrature amplitude modulation) may be included.

For the sake of convenience of explanation, the present invention is described by using some embodiments. But, classification into each embodiment is not essential in the present invention, and equal to or more than two embodiments may be used as necessary. While specific numerical value examples are used to facilitate understanding of the present invention, such numerical values are merely examples, so that any appropriate value may be used unless specified otherwise.

As described above, while the present invention is described with reference to specific embodiments, the respective embodiments are merely exemplary, so that a skilled person will understand variations, modifications, alternatives, and replacements. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-121303, filed in the JPO on May 1, 2007, and the entire contents of the Japanese patent application No. 2007-121303 is incorporated herein by reference.

The invention claimed is:

1. A base station apparatus for transmitting a L1/L2 control channel to a user apparatus to communicate with the user apparatus,
wherein a plurality of combinations of a modulation scheme and a channel coding scheme which include a plurality of types of coding rates are prepared, and the user apparatus reports downlink feedback information, the base station apparatus comprising:
a feedback information collecting unit configured to collect the downlink feedback information;
a statistic calculation unit configured to calculate a statistic based on the feedback information collected by the feedback information collecting unit;
a cell determination unit configured to determine whether a cell covered by the base station apparatus is an isolated cell or a cellular cell based on the statistic; and
a setting unit configured to set a combination of the modulation scheme and the channel coding rate to be applied to the L1/L2 control channel based on the determination result.

2. The base station apparatus as claimed in claim 1, wherein the user apparatus reports downlink SINR as the feedback information,
the statistic calculation unit calculates an average value of the downlink SINR as the statistic,
the cell determination unit determines that the cell is the isolated cell if the statistic is equal to or greater than a predetermined threshold which is determined beforehand, and determines that the cell is the cellular cell if the statistic is less than the predetermined threshold which is determined beforehand.

3. The base station apparatus as claimed in claim 2, wherein, the setting unit sets a combination of the modulation scheme and the channel coding scheme in which the coding rate is high when the cell is determined to be the isolated cell, and the setting unit sets a combination of the modulation scheme and the channel coding scheme in which the coding rate is lower than that for the isolated cell when the cell is determined to be the cellular cell.

4. The base station apparatus as claimed in claim 1, wherein the combinations of the modulation scheme and the channel coding scheme include a plurality of types of modulation schemes.

5. The base station apparatus as claimed in claim 1, comprising:
a broadcast unit configured to report the set combination of the modulation scheme and the channel coding scheme to a user apparatus residing in the cell.

6. A communication control method in a base station apparatus for transmitting a L1/L2 control channel to a user apparatus to communicate with the user apparatus,
wherein a plurality of combinations of a modulation scheme and a channel coding scheme which include a plurality of types of coding rates are prepared, the communication control method comprising:
a feedback information reporting step in which the user apparatus reports downlink feedback information;
a feedback information collecting step in which the base station apparatus collects the downlink feedback information;
a statistic calculation step in which the base station apparatus calculates a statistic based on the feedback information collected in the feedback information collecting step;
a cell determination step in which the base station apparatus determines whether a cell covered by the base station apparatus is an isolated cell or a cellular cell based on the statistic; and
a setting step in which the base station apparatus sets a combination of the modulation scheme and the channel coding scheme to be applied to the L1/L2 control channel based on the determination result.

* * * * *